(12) United States Patent
Destino et al.

(10) Patent No.: US 7,519,013 B2
(45) Date of Patent: Apr. 14, 2009

(54) SPATIAL REUSE IN A WIRELESS COMMUNICATIONS NETWORK

(75) Inventors: Giuseppe Destino, Mesagne (IT); Leonardo Goratti, Oulu (FI); Ulrico Celentano, Oulu (FI); Jukka Reunamäki, Tampere (FI); Harald Kaaja, Lallankatu (FI)

(73) Assignee: Nokia Corporation, Espoo (FI)

( * ) Notice: Subject to any disclaimer, the term of this patent is extended or adjusted under 35 U.S.C. 154(b) by 580 days.

(21) Appl. No.: 11/170,116

(22) Filed: Jun. 30, 2005

(65) Prior Publication Data

US 2007/0002803 A1    Jan. 4, 2007

(51) Int. Cl.
    *H04B 7/00* (2006.01)
(52) U.S. Cl. .............. 370/310; 370/328; 370/329; 370/338; 455/450; 455/522
(58) Field of Classification Search .......... 370/310, 370/328, 338, 329; 455/450, 52.14, 522
See application file for complete search history.

(56) References Cited

U.S. PATENT DOCUMENTS

| | | | |
|---|---|---|---|
| 5,758,090 A | 5/1998 | Doner | |
| 6,154,655 A | 11/2000 | Borst et al. | |
| 6,337,984 B1 * | 1/2002 | Hong et al. | 455/439 |
| 6,807,165 B2 | 10/2004 | Belcea | |
| 7,136,624 B2 * | 11/2006 | Ofuji et al. | 455/63.4 |
| 2003/0207699 A1 | 11/2003 | Shpak | |
| 2004/0171402 A1 | 9/2004 | Tamaki et al. | |
| 2006/0013338 A1 * | 1/2006 | Gore et al. | 375/324 |

FOREIGN PATENT DOCUMENTS

| | | |
|---|---|---|
| EP | 1489788 A2 | 12/2004 |
| WO | WO 02/39620 A1 | 5/2002 |

OTHER PUBLICATIONS

International Search Report dated Dec. 13, 2006.
Giuseppe Destino, *Access Technique for Wireless Personal Area Network Using Ultra Wide Bandwidth Radio Interface*, Graduate Department of Electronic and Telecommunication Politechnic of Turin and Eur'ecom (2004) (Doctoral Thesis).

* cited by examiner

*Primary Examiner*—Nghi H Ly
(74) *Attorney, Agent, or Firm*—Locke Lord Bissell & Liddell LLP

(57) ABSTRACT

The present invention provides techniques for spatial reuse in wireless communications networks. Accordingly, the present invention provides A device participates in a wireless communications network. The network has a shared transmission medium for the exchange of communications traffic. Further, the device determines a value for at least one interference condition in the shared transmission medium of the wireless communications network. Based on this value, a planned transmission to a remote wireless communications device is scheduled. For instance, when this value is less than a predetermined threshold, this scheduling employs a time-overlapping access technique.

26 Claims, 10 Drawing Sheets

SPATIAL REUSE IN A WIRELESS COMMUNICATIONS NETWORK

FIELD OF THE INVENTION

The present invention relates to wireless communications. More particularly, the present invention relates to techniques that increase the communications capacity of wireless communications networks.

BACKGROUND OF THE INVENTION

Short-range wireless proximity networks typically involve devices that have a communications range of one hundred meters or less. To provide communications over long distances, these proximity networks often interface with other networks. For example, short-range networks may interface with cellular networks, wireline telecommunications networks, and the Internet.

Various short-range networks, such as Bluetooth and IEEE 802.15.3 networks, are referred to as wireless personal area networks (WPANs) or piconets. These networks include a single coordinator device (e.g, a master or piconet coordinator) and multiple non-coordinating devices (e.g., DEVs or slave devices).

A high rate physical layer (PHY) standard is currently being selected for IEEE 802.15.3a. The existing IEEE 802.15.3 media access control layer (MAC) is supposed to be used as much as possible with the selected PHY. Currently, there are two remaining PHY candidates. One of these candidates is based on frequency hopping application of orthogonal frequency division multiplexing (OFDM). The other candidate is based on M-ary Binary offset Keying. The OFDM proposal is called Multiband OFDM (MBO). Moreover, in order to further develop the OFDM proposal outside of the IEEE, a new alliance has been formed called the MultiBand OFDM Alliance (MBOA).

MBO utilizes OFDM modulation and frequency hopping. MBO frequency hopping may involve the transmission of each of the OFDM symbols at various frequencies according to pre-defined codes, such as Time Frequency Codes (TFCs). Time Frequency Codes can be used to spread interleaved information bits across a larger frequency band.

Presently, there is an interest within the MBOA to create a Medium Access Control (MAC) layer that would be used with the OFDM physical layer instead of the IEEE 802.15.3 MAC layer. A current version of the MBOA MAC involves a group of wireless communications devices (referred to as a beaconing group) that are capable of communicating with each other. The timing of beaconing groups is based on a repeating pattern of "superframes" in which the devices may be allocated communications resources.

MAC layers govern the exchange among devices of transmissions called frames. A MAC frame may have various portions. Examples of such portions include frame headers and frame bodies. A frame body includes a payload containing data associated with higher protocol layers, such as user applications. Examples of such user applications include web browsers, e-mail applications, messaging applications, and the like.

In addition, MAC layers govern the allocation of resources. For instance, each device requires an allocated portion of the available communication bandwidth to transmit frames. The current MBOA MAC proposal provides for the allocation of resources to be performed through communications referred to as beacons. Beacons are transmissions that devices use to convey non-payload information. Each device in a beaconing group is assigned a portion of bandwidth to transmit beacons.

Such transmissions allow the MBOA MAC to operate according to a distributed control approach, in which multiple devices share MAC layer responsibilities. Accordingly, the current MBOA MAC Specification (version 0.95, April 2005) provides various channel access mechanisms that allow devices to allocate portions of the transmission medium for communications traffic. These mechanisms include a protocol called the distributed reservation protocol (DRP), and a protocol called prioritized contention access (PCA).

As the use of communications networks, such as WPANs, becomes progressively more prevalent, it is desirable to increase network capacity. Also, it is desirable to conserve transmission power and reduce interference levels. Accordingly, techniques are needed to achieve these goals especially in congested network conditions.

SUMMARY OF THE INVENTION

The present invention provides techniques for spatial reuse in wireless communications networks. Accordingly, the present invention provides a method and device that participate in a wireless communications network. The network has a shared transmission medium for the exchange of communications traffic. Further the method and apparatus determine a value for at least one interference condition in the shared transmission medium of the wireless communications network. Based on this value, a planned transmission to a remote wireless communications device is scheduled. For instance, when this value is less than a predetermined threshold, this scheduling employs a time-overlapping access technique.

The present invention also provides an apparatus having a transceiver and a controller. The transceiver exchanges signals across a wireless communications network having a shared transmission medium for the exchange of communications traffic. The controller determines a value for at least one interference condition in the shared transmission medium of the wireless communications network. In addition, the transceiver schedules a planned transmission to a remote wireless communications device. This scheduling employs a time-overlapping access technique for the planned transmission when the value for the at least one interference condition is less than a predetermined threshold. The present invention further provides computer program product aspects.

Embodiments of the present invention provide improvements in throughput by spatially allocating wireless medium among terminals participating in a wireless networks, such as de-centralized beacon based networks (MBOA networks). In addition, embodiments of the present invention provide for reduced energy consumption as a result of minimizing of the transmit power levels and a better spectral efficiency exploitation (which implies fewer corrupted packets and retransmissions). Further features and advantages of the present invention will become apparent from the following description and accompanying drawings.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION OF THE PREFERRED EMBODIMENTS

I. Operational Environment

Figure 1:
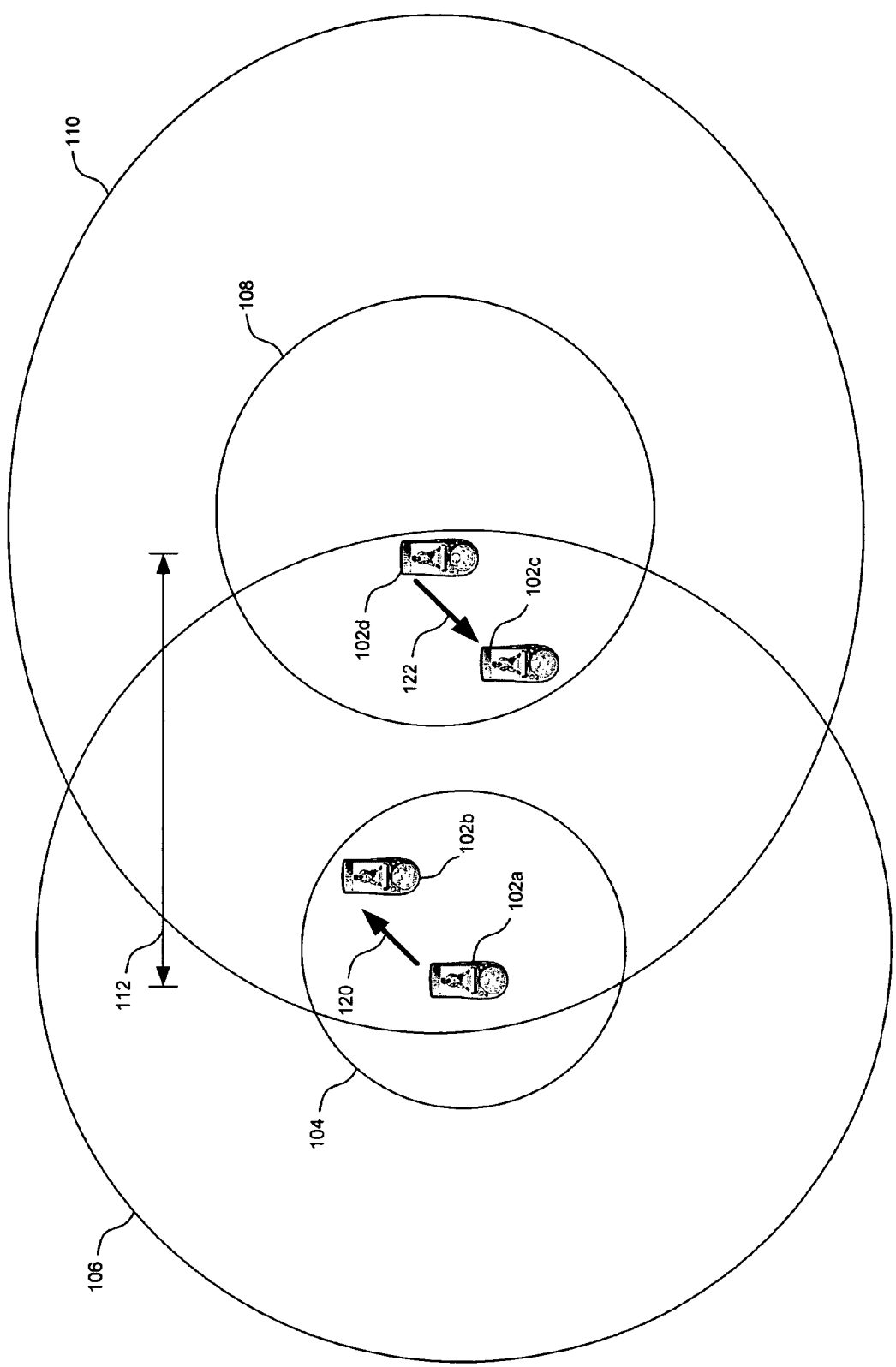
FIG. 1 is a diagram of an exemplary operational environment.

FIG. 1 is a diagram of a communications environment in which the techniques of the present invention may be employed. This environment includes multiple communications devices 102 that exchange wireless transmissions. In particular, FIG. 1 shows a device 102*a* sending a wireless transmission 120 to a device 102*b*. Also, FIG. 1 shows a device 102*d* sending a wireless transmission 122 to a device 102*c*.

For each of these transmissions, inner and outer propagation ranges are shown. For instance, an inner propagation range 104 and an outer propagation range 106 are shown for transmission 120. Likewise, an inner propagation range 108 and an outer propagation range 110 are shown for transmission 122. These are exemplary propagation ranges shown for the purposes of illustration. In fact, the actual propagation range for each transmission will depend upon the employed transmission power (as well as other environmental factors). More particularly, the greater the transmit power, the larger the propagation range.

As shown in FIG. 1, inner propagation range 104 covers the intended recipient of transmission 120 (device 102*b*), but not the intended recipient of transmission 122 (device 102*c*). Similarly, inner propagation range 108 covers the intended recipient of transmissions 122 (device 102*c*), but not the intended recipient of transmission 120 (device 102*b*). Thus, employment of these inner ranges reduces interference and minimizes power consumption.

Outer propagation ranges 106 and 110 cover the intended recipients of their respective transmissions as well as the intended recipients of the other transmissions. Therefore, employment of these outer ranges yields interference without conserving power consumption.

The inner and outer propagation ranges of FIG. 1 may represent certain operational settings established by the network. For instance, outer propagation ranges 106 and 110 may correspond to the devices operating at a maximum transmit power setting, while inner propagation ranges 104 and 108 may correspond to a power saving setting. Certain networks may require certain transmissions to be at the maximum transmit power setting. For example, MBOA networks may require beacon transmissions to be made at the maximum power setting. Such settings can provide for greater dissemination of network configuration information. This particular characteristic of MBOA networks can be utilized, according to embodiments of the present invention, to more reliably determine the physical distance between devices.

The size of network environments, such as the environment of FIG. 1, may be described in terms of a network diameter, which represents the largest distance between devices in the network. For instance, FIG. 1 shows a network diameter 112 extending between devices 102*a* and 102*d*.

In short-range wireless communications networks, the most prevalent communications are often between devices separated by distances that are substantially smaller than the network diameter. Thus, in such situations, only a relatively small fraction of network traffic is exchanged between devices separated by distances approaches the network diameter.

One such situation involves multiple people, each carrying various devices. Examples of such devices include, for example, a mobile telephone, a personal digital assistant (PDA), a wireless headset, and other devices. As an example, each individual's set of personal devices may have a mutual distance that is on the order of approximately 50 centimeters. However, in this situation, people may be separated at a substantially greater distance, such as 8 meters.

II. Superframe

Figure 2:
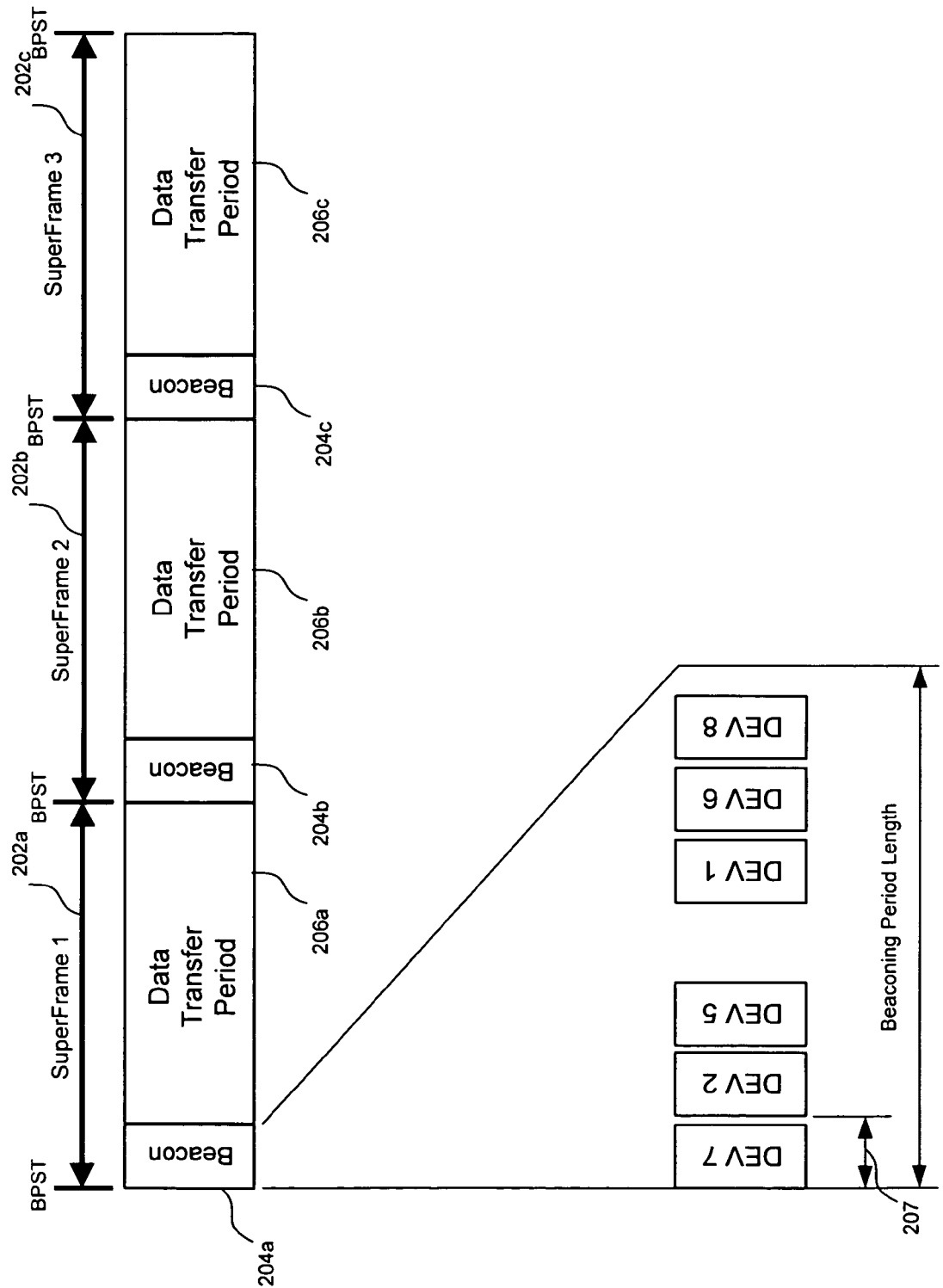
FIG. 2 is a diagram of an exemplary superframe format employed in a shared transmission medium.

Wireless network transmissions in the environment of FIG. 1 may be based on a repeating time pattern, such as a superframe. An exemplary superframe format is shown in FIG. 2. In particular, FIG. 2 shows a frame format having superframes 202*a*, 202*b*, and 202*c*.

Each superframe 202 includes a beacon period 204 and a data transfer period 206. Beacon periods 204 convey transmissions from each of the active devices in the beaconing group. Accordingly, each beacon period 204 includes multiple beacon slots 207. Slots 207 each correspond to a particular device in the network (including the coordinator device). During these slots, the corresponding device may transmit various overhead or networking information.

For instance, such information may be used to set resource allocations and to communicate management information for the beaconing group. In addition, according to the present invention, data transfer periods 206 may be used to transmit information regarding services and features (e.g., information services, applications, games, topologies, rates, security features, etc.) of devices within the beaconing group. The transmission of such information in beacon periods 204 may be in response to requests from devices, such as scanning devices.

Data transfer period 206 is used for devices to communicate data according to various transmission schemes. These schemes may include, for example, frequency hopping techniques that employ OFDM and/or time frequency codes (TFCs). For instance, data transfer periods 206 may support data communications across links 120 and 122. In addition, devices (e.g., DEVs 102*a-d*) may use data transfer periods 206 to transmit control information, such as request messages to other devices. To facilitate the transmission of traffic, each device may be assigned a particular time slot within each data transfer period 206. In the context of the MBOA MAC, these time slots are referred to as media access slots (MASs).

A MAS is a period of time within data transfer period 206 in which two or more devices are protected from contention access by devices acknowledging the reservation. According to the MBOA MAC, MASs may be allocated by a distributed protocol, called the distributed reservation protocol (DRP). Alternatively, the MBOA MAC provides for resource allocation according to a prioritized contention access (PCA) protocol. Unlike DRP, PCA isn't constrained to reserving one or more entire MASs. Instead, PCA can be used to allocate any part of the superframe that is not reserved for beaconing or DRP reservations.

III. Power Considerations

Figure 3:
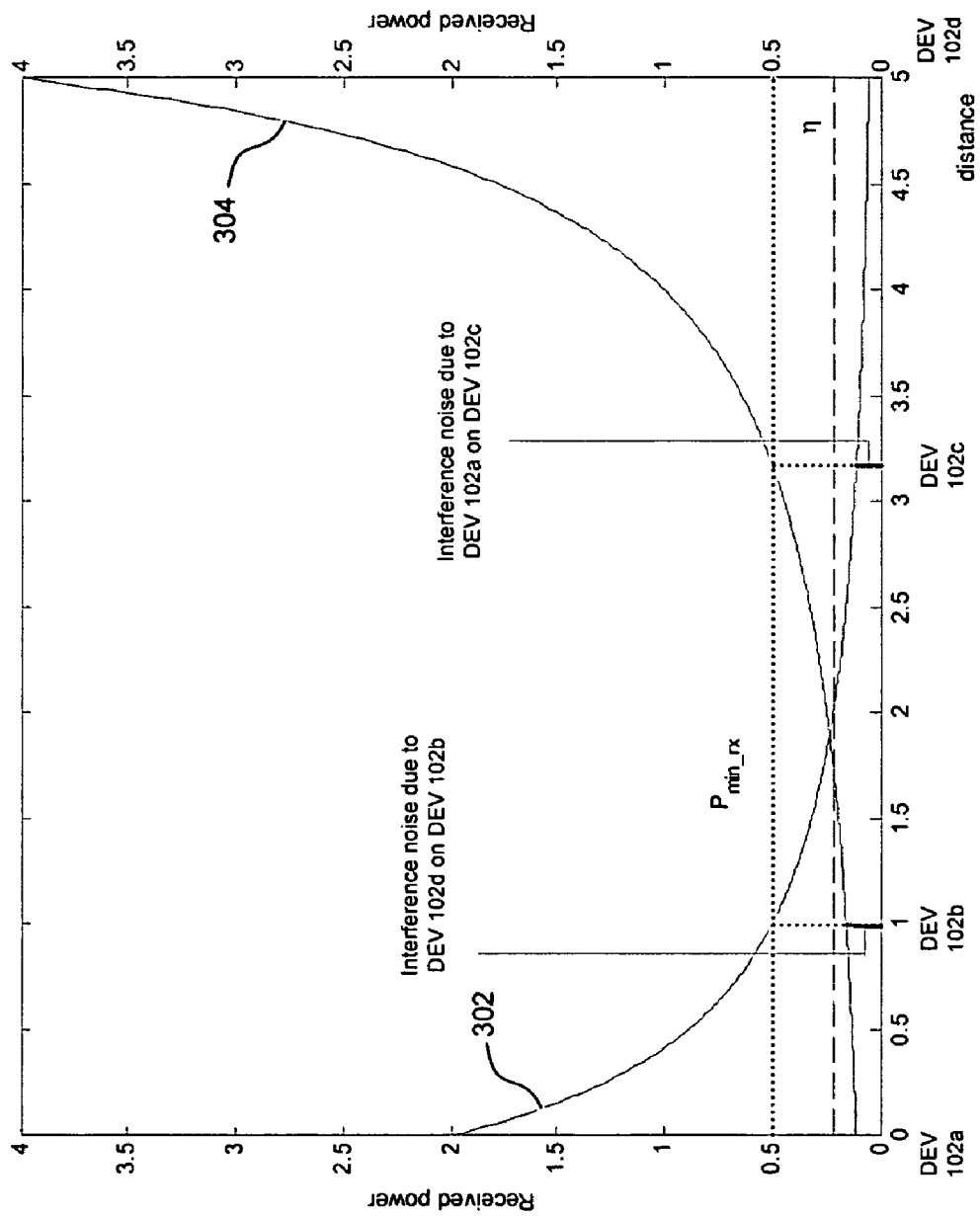
FIG. 3 is a graph showing received power curves.

FIG. 3 is an exemplary graph showing received power curves of the two transmissions of FIG. 1: a curve 302 corresponding to a transmission from device 102*a* to device 102*b*, and a curve 304 corresponding to a transmission from device 102*d* to device 102*c*. According to aspects of the present invention, the transmitting devices set their transmit power by estimating the expected attenuation based on the distance information so that a target received power level (Pmin_rx) is reached.

Also, if the device determines that its transmission will cause interference to other receivers that is lower than the threshold, it will proceed with its transmission. In the context of MBOA, this determination is performed within the same superframe when beacons are grouped together in a beacon period. Alternatively, the determination is performed in a following superframe when beacons are spread across the superframe.

IV. Time Overlapping Transmission

In aspects of the present invention, devices obtain knowledge regarding the locality of other devices. From this knowledge, data transmissions may be scheduled in a manner that increases network capacity and conserves energy. For instance, certain transmissions may be scheduled with appropriate transmit power settings so that they overlap in time (e.g., simultaneous transmissions). Such time-overlapping transmissions yield spatial reuse.

In embodiments of the present invention, scheduling of planned transmissions involves discriminating between devices that are "close" and devices that are "far". This discrimination may be quantitative. For instance, devices may compile locality information regarding mutual distances between devices. Examples of such locality information include received signal strength measurements and/or physical distance information.

A device may obtain locality information in various ways. For example, locality information may be obtained through network layer and/or physical layer protocols. For instance, this information may include received signal strength information (RSSI) that is furnished by the device's physical layer. Moreover, locality information may be obtained through other approaches, such as one that evaluate time offsets between various transmissions.

In addition to obtaining locality information, a device may also obtain knowledge of planned transmissions between other devices. Based on this obtained knowledge and locality information, the device may schedule transmissions that overlap in time with other devices' transmissions without interfering with these transmissions. This scheduling technique is referred to herein as time-overlapping access.

Figure 4:
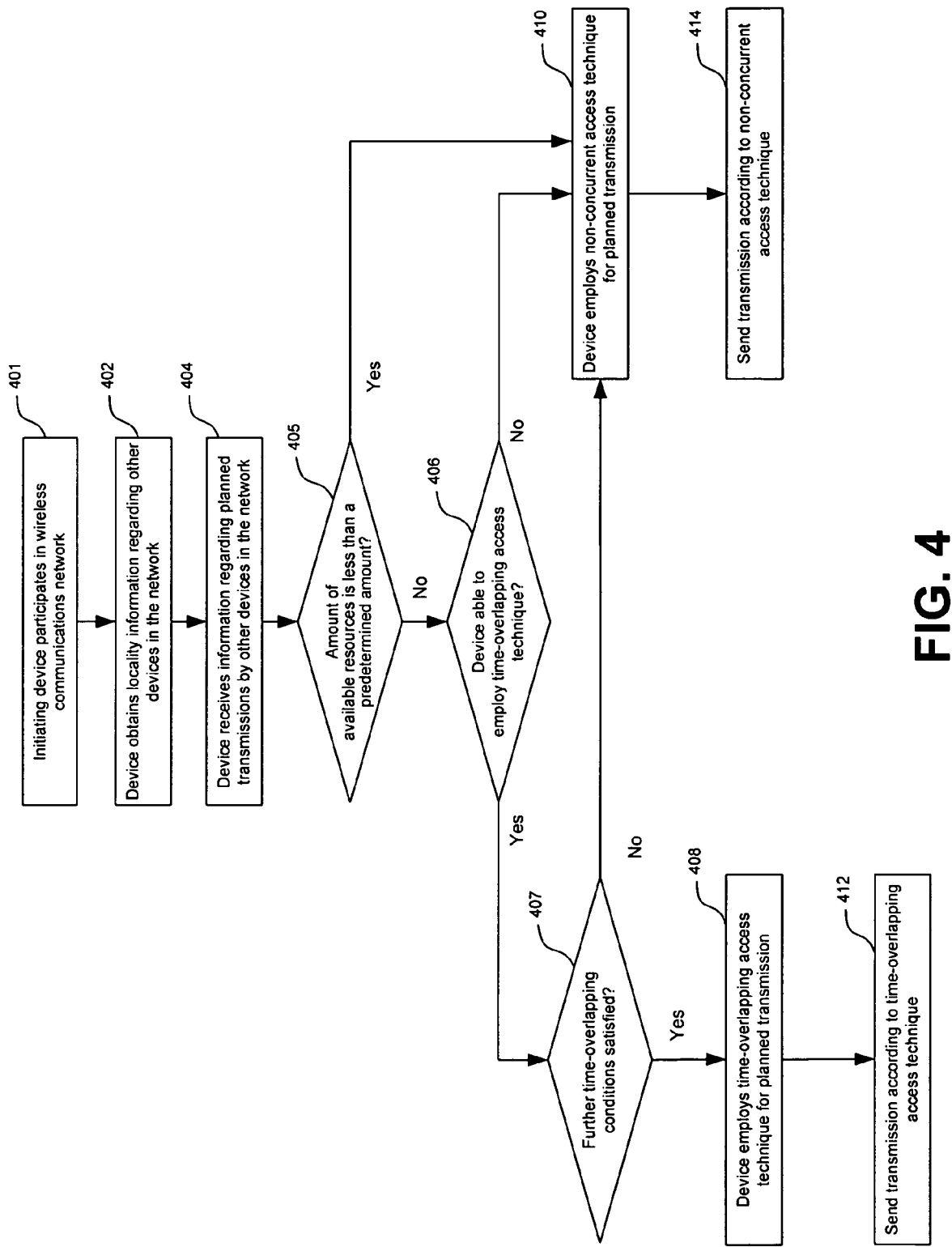
FIGS. 4-8 are flowchart of exemplary device operations, according to embodiments of the present invention.

FIG. 4 is a flowchart of a device operation in accordance with this approach, according to an embodiment of the present invention. In this operation, the device participates in a wireless communications network that employs a shared transmission medium, such as a repeating time frame within a particular frequency range.

In a step 401, the device participates in a wireless communications network having a shared transmission medium. For instance, the network may be a personal area network employing a repeating frame format, such as the superframe format of FIG. 2. Examples of networks employing repeating frame formats include IEEE 802.15.3, and MBOA networks.

In a step 402, the device obtains locality information regarding other devices in the network. As described above, this locality information may include signal strength indicators corresponding to signals received from other devices, as well as actual distance between the devices and/or location information regarding the other devices.

In a step 404, the device receives information regarding planned transmissions by other devices in the network. This information may be received in various ways. For example, the device may obtain this information through the reception of beacon transmissions from the other devices. With reference to the example of FIG. 2, such beacon transmissions may indicate transmissions that are scheduled for an upcoming data transfer period.

The operation of FIG. 4 includes an optional step 405. In this step, the device may assess the "density" or "congestion" of the network. This step may include monitoring the availability of network resources through, for example, processing information in received beacon transmissions. If the amount of available resources is less than a predetermined amount, then operation proceeds to step 406. Otherwise, operation proceeds to a step 410 in which non-concurrent access is employed because spatial reuse is not imperative when sufficient bandwidth availability exists. The amount of available resources may be determined in various ways. Exemplary ways include the number of reserved connections, the aggregate bandwidth of the reserved connections, the percentage of total bandwidth that is occupied, etc.

Based on the information obtained in steps 402 and 404, the device determines, in a step 406, an access technique for an upcoming transmission. In particular, the device determines whether it is able to employ time-overlapping access or non-concurrent access for this upcoming transmission. In embodiments, step 406 comprises determining a value for at least one interference condition in the shared transmission medium of the wireless communications network.

If the time-overlapping access is available, then operation proceeds to a step 408. In this step, the device employs time overlapping access for the transmission. This step may include scheduling its upcoming transmission. Based on the device's knowledge of other devices' transmissions and their locality, step 408 results in the shared transmission medium being accessed simultaneously. However, this simultaneous access occurs at proper transmit power levels so that negligible interference occurs between transmissions.

Alternatively, if it is determined in step 406 that time-overlapping access is not available, then operation proceeds to step 410 in which the device employs non-concurrent access for the transmission. As a result, potential interference is avoided, but the advantages of spatial reuse are not obtained.

FIG. 4 further shows a step 412 following step 408 and a step 414 following step 410. In step 412, the device sends its planned transmission, which was scheduled according to the time-overlapping access technique in step 408. This step may also comprise sending the transmission at a reduced power level. This reduced power level supports non-interfering overlapping reservations. In step 414, the device sends its planned transmission, which was scheduled according to the non-concurrent access technique in step 410.

The operation of FIG. 4 shows time-overlapping access applied whenever it is available. However, in alternative embodiments, time-overlapping access is not always used when possible. Rather, as indicated by an optional step 407, this access technique is employed when further conditions are met.

The flowchart of FIG. 4 demonstrates that devices may determine whether to employ time-overlapping access of a shared transmission medium based on locality information (which indicates whether physical distances between connections are great enough to avoid interference) and planned network transmissions. Time overlapping access may enhance network throughput by allowing devices to reuse bandwidth and reduce interference levels. In the context of MBOA networks, devices may perform such techniques for scheduling access in conjunction with both DRP and PCA protocols. However, the PCA protocols is more flexible for reservations made "on the fly."

V. Transmit Power Levels

In embodiments of the present invention, the transmit power used for transmitting beacons is always set so that all devices in the network may receive these transmissions. However, the transmit power used for transmitting data is minimized according to the expected attenuation from the transmitting device to the receiving device. However, due to actual link conditions, the power setting may sometimes be insufficient for successful reception.

When a receiving device fails to receive a data transmission in the expected period, it may request retransmission by sending a control transmission (e.g., a beacon) having certain information (e.g., information elements). With reference to MBOA, examples of such information include: a Retrasm_request information element with the address of the corresponding transmitter; and a Reason_field (which can be implemented with one bit):

When this field is set to "1", it indicates that the transmitted data (e.g., frame) was corrupted, so the transmitting device needs to re-transmit the data with higher power. However, when this field is set to "0", it indicates a possible collision or jammed reception. If multiple requests were announced for the same device (e.g., due to a hidden node), the receiving may use this command to choose the transmitting device allowed to re-transmit. When clear-to-send (CTS) packets are used to confirm, the Retrasm_request information element may also used to require a re-transmission or a new transmission in a future superframe (e.g., SF[m+1]).

VI. Overview of Approaches

As described above with reference to FIG. 4, locality information is obtained in step 402. In embodiments, this locality information is stored in a locality information database (LIDB). However, the appropriate access technique (e.g., time-overlapping or non-concurrent) is determined in step 406. This determination is also referred to herein as the simultaneous transmission test (STT).

Various LIDB and STT approaches are within the scope of the present invention. For instance, embodiments of the present invention involve the use of LIDBs and STTs that are based on signal strength information, such as received signal strength indicators (RSSIs). However, further embodiments involve the use of LIDBs and STTs that are based on mutual distance information (MDI). Such RSSI approaches give an intrinsic priority to devices separated by relatively shorter distances, while MDI approaches give an intrinsic priority to devices separated by relatively greater distances.

VII. Received Signal Strength Approaches

Figure 5:
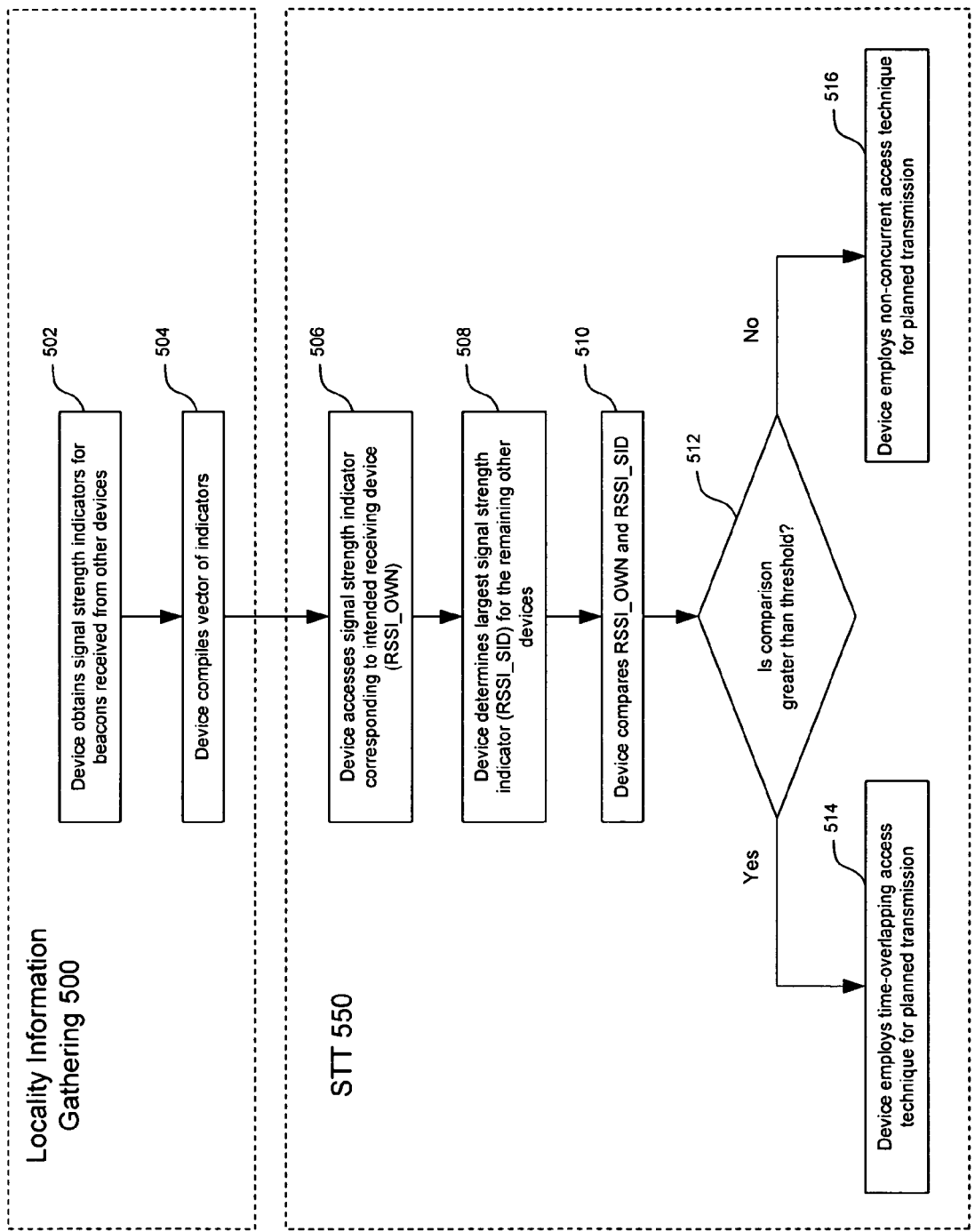

One such RSSI-based approach is shown in FIG. 5, which is a flowchart of a device operation according to an embodiment of the present invention.

The flowchart of FIG. 5 includes a locality information gathering operation 500 and an STT operation 550. Gathering operation 500 includes a step 502 in which the device obtains an RSSI from each received beacon. Gathering operation 500 also includes a step 504. In this step, the device compiles a vector of these RSSIs. When devices in the network send beacons at a known transmit power, each RSSI provides the device with an estimate of the path loss between it and the transmitting device. These path loss estimates may be used to assess interference levels.

FIG. 5 shows STT operation 550 following gathering operation 500. As shown in FIG. 5, this operation includes a step 506. In this step, the device accesses from the RSSI vector, the RSSI corresponding to the beacon of the intended receiving device. This RSSI is referred to herein as RSSI_OWN.

In a step 508, the device determines the largest RSSI from the remaining RSSIs in the RSSI vector. This largest RSSI (referred to herein as RSSI_SID) is indicative of the strongest interfering device.

In a step 510, the device compares RSSI_OWN and RSSI_SID. This step may comprise subtracting RSSI_SID from RSSI_OWN. Alternatively, this step may comprise dividing RSSI_OWN by RSSI_SID.

As indicated by a step 512, if the comparison (or calculation) in step 510 is greater than a predetermined threshold, then time-overlapping access is selected in a step 514. Otherwise, non-concurrent access is selected in step 516.

Figure 6:
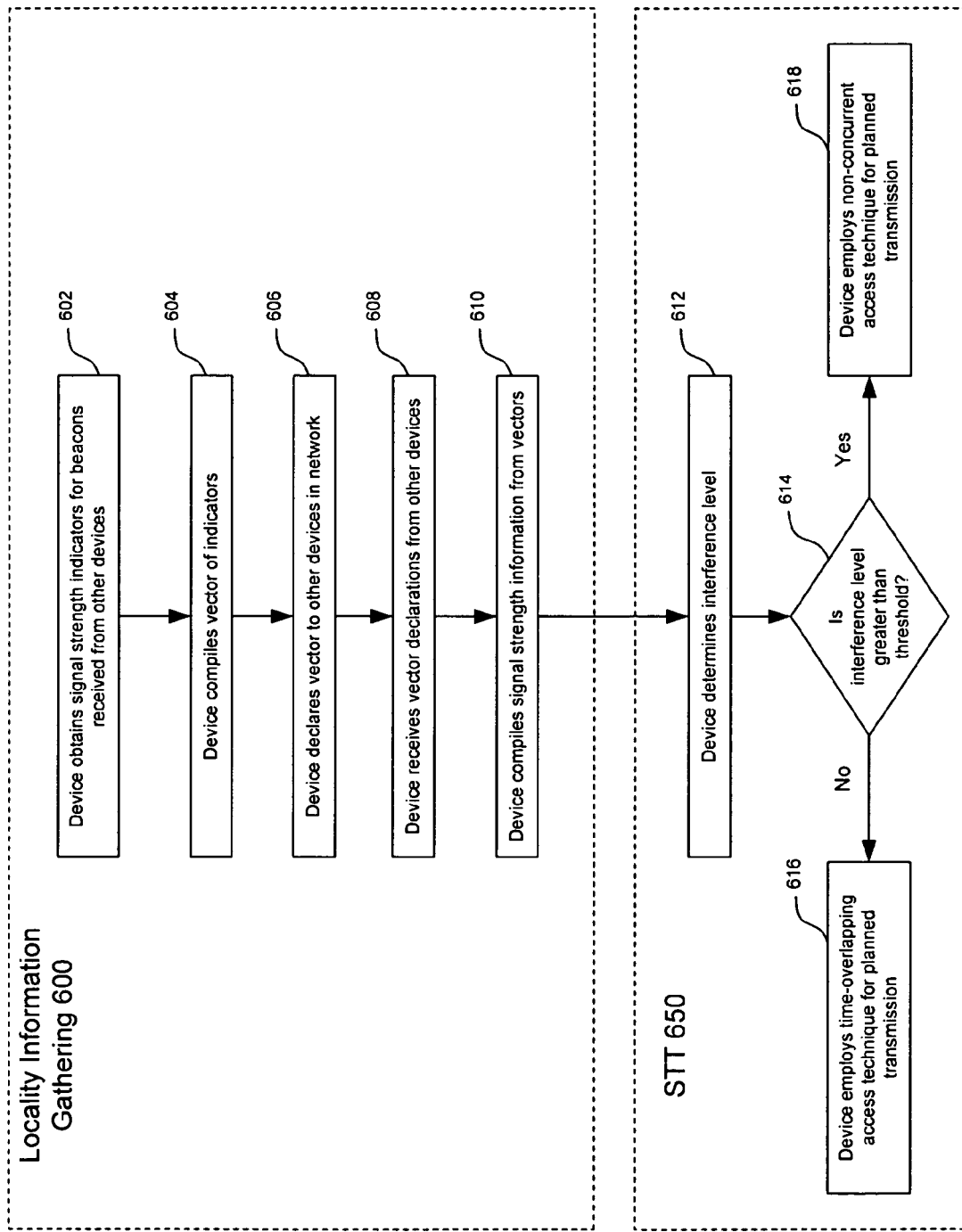

A further RSSI-based approach is shown in FIG. 6, which is a flowchart of a device operation according to an embodiment of the present invention. The flowchart of FIG. 6 includes a locality information gathering operation 600 and an STT operation 650. Gathering operation 600 includes a step 602 in which the device obtains an RSSI from each received beacon. Gathering operation 600 also includes a step 604. In this step, the device compiles a vector of these RSSIs.

In a step 606, the device declares its RSSI vector to the other devices in the network. This may be done on a periodic basis or in response to a request from another device. Likewise, in a step 608, the device receives RSSI vector declarations from the other devices in the network.

Upon receipt of the declarations from the other devices, the device performs a step 610. In this step, the device builds an RSSI table (RSSIT) from its own RSSI vector and the RSSI vectors received in step 608.

FIG. 6 shows that STT operation 650 includes a step 612. In this step, the device determines the interference level on the intended receiving device based on information in the RSSIT. Various techniques may be employed to determining this interference level. Exemplary techniques are based on a mode of network operation in which each transmitting DEV uses the minimum power needed to reach its intended receiving device. Based on this operational mode, each DEV can estimate the interference level at its own receiver due to other transmissions. Such techniques are described below in greater detail.

As indicated by a step 614, the device determines whether the interference level determined in step 610 is greater than a predetermined threshold. If so, then operation proceeds to a step 616. In this step, time-overlapping access is selected. Otherwise, non-concurrent access is selected in step 618.

An exemplary RSSIT is shown below in Table 1.

TABLE 1

|      | DEV1 | DEV2 | DEV3 | DEV4 | DEV5 |
|------|------|------|------|------|------|
| DEV1 | 0 | $RSSI_{12}$ | $RSSI_{13}$ | $RSSI_{14}$ | $RSSI_{15}$ |
| DEV2 | $RSSI_{21}$ | 0 | $RSSI_{23}$ | $RSSI_{24}$ | $RSSI_{25}$ |
| DEV3 | $RSSI_{31}$ | $RSSI_{32}$ | 0 | $RSSI_{34}$ | $RSSI_{35}$ |
| DEV4 | $RSSI_{41}$ | $RSSI_{42}$ | $RSSI_{43}$ | 0 | $RSSI_{45}$ |
| DEV5 | $RSSI_{51}$ | $RSSI_{52}$ | $RSSI_{53}$ | $RSSI_{54}$ | 0 |

In this table, each row corresponds to a transmitting device, while each column corresponds to a receiving device. Thus, each table entry $RSSI_{i,j}$ is a signal strength indicator associated with a transmission (e.g., a beacon) from a particular transmitting device (DEV i) to a particular receiving device (DEV j).

Each RSSI element in the RSSIT indicates the path loss between each device pairing in the network when the corresponding transmission is sent at a known transmit power. Therefore, the RSSIT provides a device with the capability to measure/estimate of the interference level at an intended receiving device due to other device's transmissions.

Figure 7:
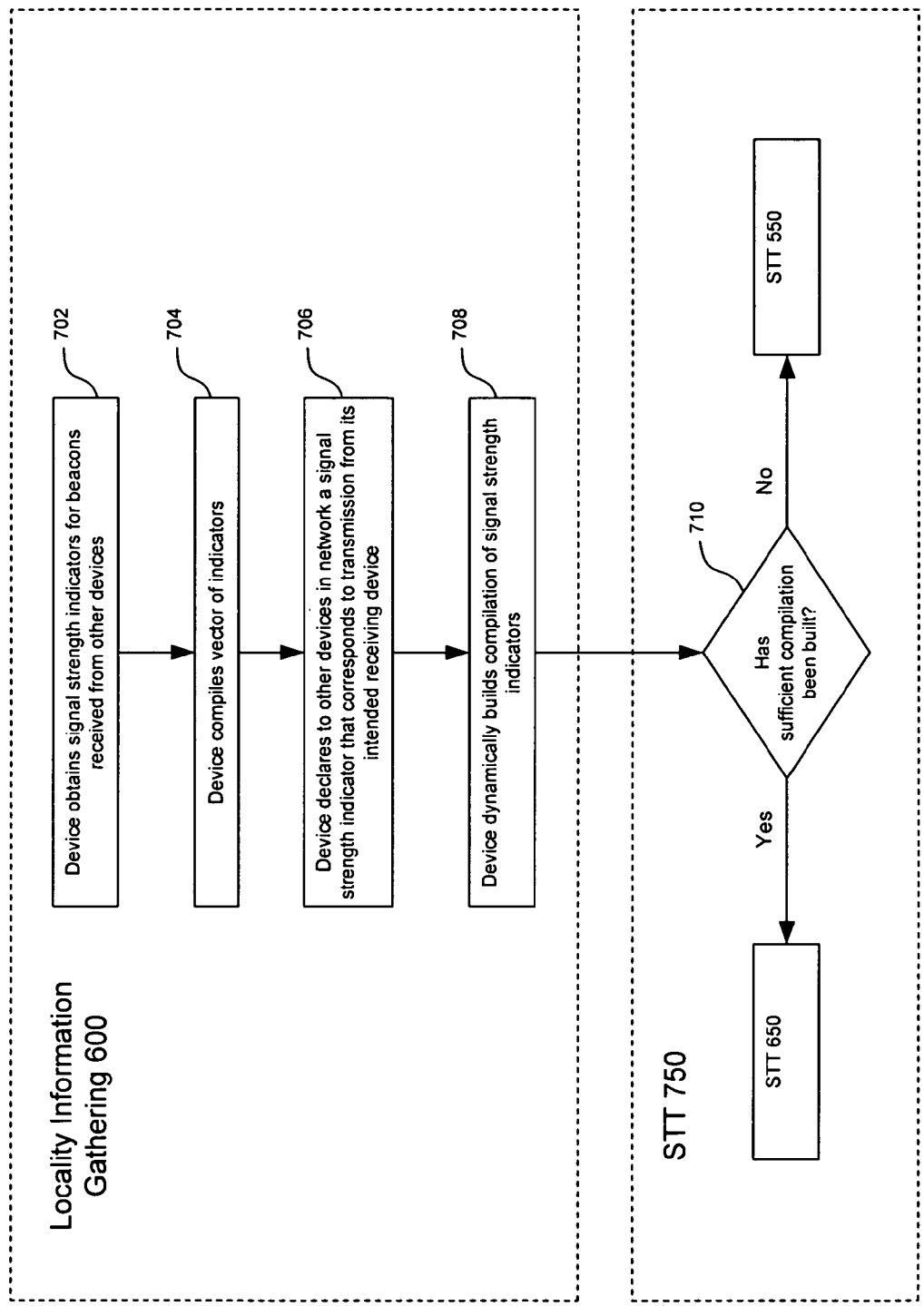

In embodiments of the present invention, devices may employ STT approaches that are adaptable. For instance, the device may select from among various STT operations based on the amount of locality information it possesses. FIG. 7 is a flowchart of an operation employing such an adaptable approach, according to an embodiment of the present invention.

FIG. 7 includes a locality information gathering operation 700 and an STT operation 750. As shown in FIG. 7, gathering operation 700 includes a step 702 in which the device obtains an RSSI from each received beacon. In addition, gathering operation 700 includes a step 704. In this step, the device compiles a vector of these RSSIs.

In a step 706, the device declares to other devices in network an RSSI corresponding to a transmission (e.g., a beacon) from its intended receiving device. In turn, the device receives such declarations from the other network devices. From these declarations, the device builds a compilation of RSSI information in a step 708.

Operation 750 includes a step 710. This step shows that the device may select among various STT operations based on the extent of its RSSI compilation. For instance, if a sufficient compilation (e.g., a complete RSSIT) has been established, gathering operation 650 of FIG. 6 may be performed. However, if a sufficient compilation has not been established, then gathering operation 550 of FIG. 5 may be performed.

VIII. Interference Level Determination

As described above, STT operation 650 of FIG. 6 determines the interference level on the intended receiving device in a step 610. Also, as described above, this approach applies an operational mode in which each transmitting device in the network sends its data transmissions at a power level so that the transmission arrives at its intended receiving device at a minimum power (referred to herein as $P_{min\_rx}$) that is sufficient for reception. In addition, this approach may be employed in networks in which devices send their beacon transmissions at a predetermined transmit power level, which is referred to herein as $P_{tx\_BEACON}$.

Accordingly, the device calculates a transmit power, $P_{tx\_DATA}$, for its planned data transmission to an intended receiving device based on $P_{min\_rx}$ and RSSI_OWN. As described above, RSSI_OWN is the RSSI corresponding to the beacon of the intended receiving device. This calculation is expressed below in Equation (1).

$$P_{tx\_DATA} = P_{min\_rx} \cdot \frac{P_{tx\_BEACON}}{RSSI\_OWN} \quad (1)$$

The total interference level at a given receiving device, DEVy, can be computed as the sum of all contributions from transmitting devices. This total interference level, Pmax_int_rx$_y$, is expressed below in Equation (2).

$$P\max\_int\_rx_y = \sum_{i \neq x} P_{tx_i - rx_y} \quad (2)$$

Upon the calculation of Equation (2), DEVx may proceed with time-overlapping access for the planned transmission if Pmax_int_rx$_y$ is less than a predetermined threshold, $\eta$. Otherwise the device proceeds with non-concurrent access.

Referring again to Equation (2), the expression for Pmax_int_rx$_y$ includes a summation argument, $P_{tx_i - rx_y}$. This argument is the independent interference contribution of a first device (DEVi) at DEVy. Calculating these independent contributions involves computing the product of a transmit power of DEVx and a path loss between DEVx and DEVy.

Path loss can be computed as expressed below in Equation (3), which expresses the path loss between a device i and a device j.

$$PL[i, j] = \frac{RSST[i, j]}{P_{tx\_BEACON}} \quad (3)$$

As shown in Equation (3). Path loss between devices i and j may be calculated from their corresponding RSST entry and the transmit power of device i, which is expressed as $P_{tx\_BEACON}$.

Based on this path loss, interference contributions may be calculated, according to Equation (4), below.

$$P_{tx_i - rx_y} = P_{tx_i} \cdot PL[DEVTXi, DEVRXy] \quad (4)$$

In Equation (4) $P_{tx_i}$ is the transmission power used by DEVi to reach its intended receiving device, DEVRXi. Ptxi may be calculated according to Equation (5), below.

$$P_{tx_i} = \frac{P_{min\_rx}}{PL[DEVTXi, DEVRXi]} \quad (5)$$

As indicated by Equation (2) above, calculation of the total interference level, Pmax_int_rx$_y$, involves a summation of individual interference contributions for a number of device pairings (e.g., all devices in the RSSIT). However, in embodiments of the present invention, a simplified technique may be employed. In one such technique, only a highest interference contribution (HIC) is considered. This HIC is expressed below in Equation (6).

$$HIC = \max\left(\frac{PL[DEVTXi, DEVRXy]}{PL[DEVTXi, DEVRXi]}\right) \max\left(\frac{RSST[DEVTXi, DEVRXy]}{RSST[DEVTXi, DEVRXi]}\right) \quad (6)$$

According to this technique, DEVx may proceed with time-overlapping access for the planned transmission if the HIC is less than a predetermined threshold, such as $\eta$. Otherwise the device proceeds with non-concurrent access.

As with the more involved technique, this alternative solution may be not reliable if the interference contributions are of the same order of magnitude.

IX. Mutual Distance Approaches

Figure 8:
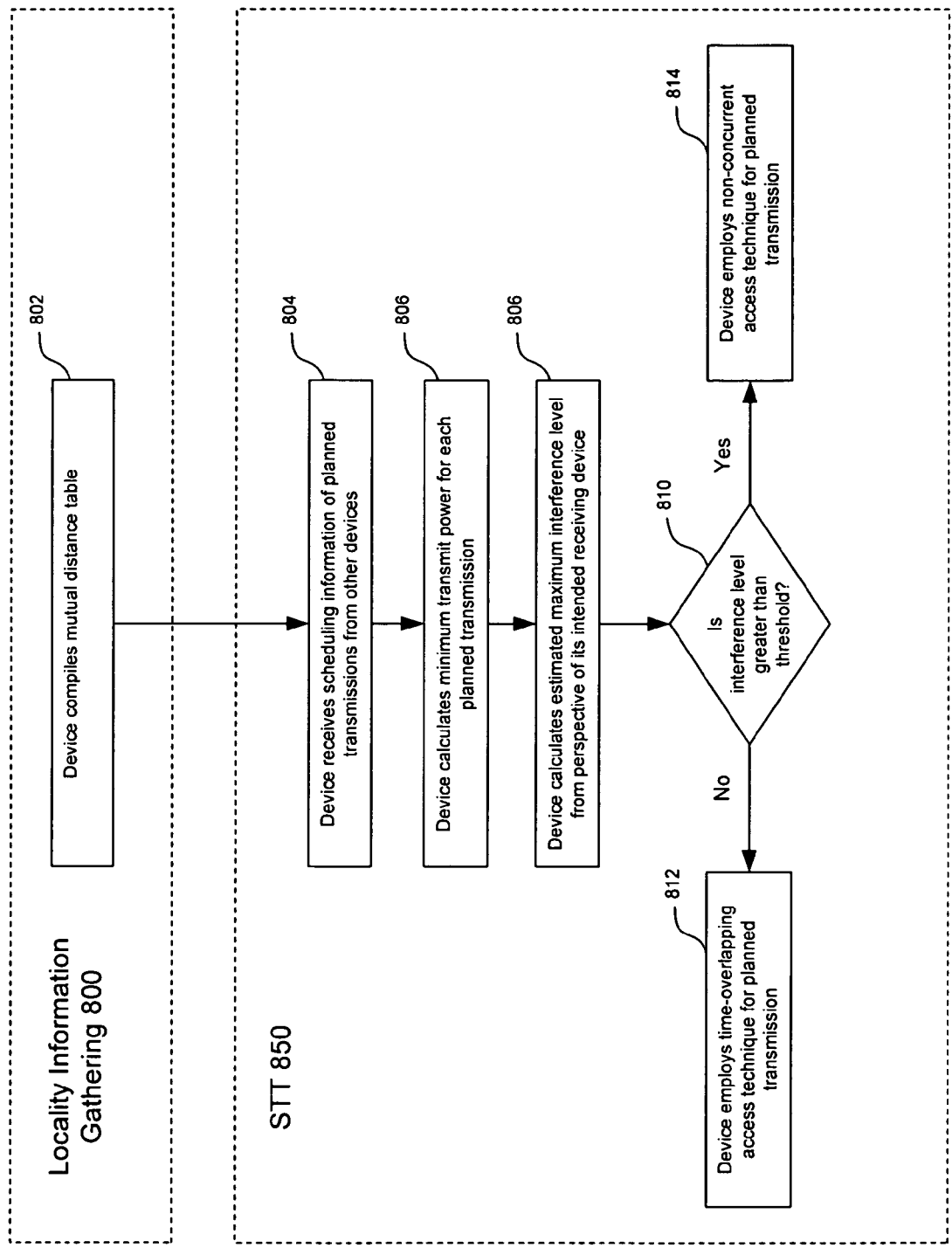

As described above, LIDB and STT approaches may be based on mutual distance information instead of received signal strength information. FIG. 8 is a flowchart of such an approach, according to an embodiment of the present invention. In this approach, a device uses mutual distance information to estimate the interference level at an intended receiving device. This approach includes a locality information gathering operation 800 and an STT operation 850.

As shown in FIG. 8, locality information gathering operation 800 includes a step 802. In this step, the device compiles a mutual distance table (MDT) in which the distances between device pairings are stored. In embodiments employing fully connected networks, each device may have the same MDT.

An exemplary MDT is shown below in Table 2.

TABLE 2

|      | DEV1     | DEV2     | DEV3     | DEV4     | DEV5     |
|------|----------|----------|----------|----------|----------|
| DEV1 | 0        | $D_{12}$ | $D_{13}$ | $D_{14}$ | $D_{15}$ |
| DEV2 | $D_{21}$ | 0        | $D_{23}$ | $D_{24}$ | $D_{25}$ |
| DEV3 | $D_{31}$ | $D_{32}$ | 0        | $D_{34}$ | $D_{35}$ |
| DEV4 | $D_{41}$ | $D_{42}$ | $D_{43}$ | 0        | $D_{45}$ |
| DEV5 | $D_{51}$ | $D_{52}$ | $D_{53}$ | $D_{54}$ | 0        |

In this table, each row corresponds to a transmitting device, while each column corresponds to a receiving device. Thus, each table entry $D_{i,j}$ is a distance from a particular transmitting device (DEV i) to a particular receiving device (DEV j).

FIG. 8 shows that STT operation 850 includes a step 804. In this step, the device receives scheduling information of planned data transmissions from other devices in the network. This information may be included, for instance, in beacon transmissions.

In a step 806, the device calculates a minimum transmitted power for each of the planned transmissions. These minimum transmitted powers are calculated from the corresponding mutual distances in the MDT and assures a minimum received power, Pmin_rx, at each receiving device. These minimum transmitted powers will be also be calculated and used by the other devices for their respective transmissions.

In a step 808, the device calculates an estimated maximum interference level, Pmax_int_rx, from the perspective of its intended receiving device. Pmax_int_rx is estimated by an algorithm using the sensibility of the receiving device computed with the link budget, Pmin_rx, the exponent factor due to path-loss, α, and the MDT. This algorithm involves calculating a sum of the power ($P_{txj-rxj}$) of the received signals which are designated for reception by the intended receiving device. This calculation of Pmax_int_rx is expressed below in Equation (7).

$$\text{Pmax\_int\_rx}_j = \sum_{i \neq j} P_{tx_i - rx_j} \qquad (7)$$

In Equation (7), the subscript j refers to the intended receiving device and the subscript i refers to an interfering transmitting device.

As indicated by a step 810, the device determines whether the estimated maximum interference noise, Pmax_int_rx, is less than a predetermined threshold. If so, then time overlapping access is employed in a step 812. Otherwise, non-concurrent access is employed in a step 814. In embodiments, this predetermined threshold is based on predetermined quality of service (QoS) requirements.

X. Wireless Communications Device

Figure 9:
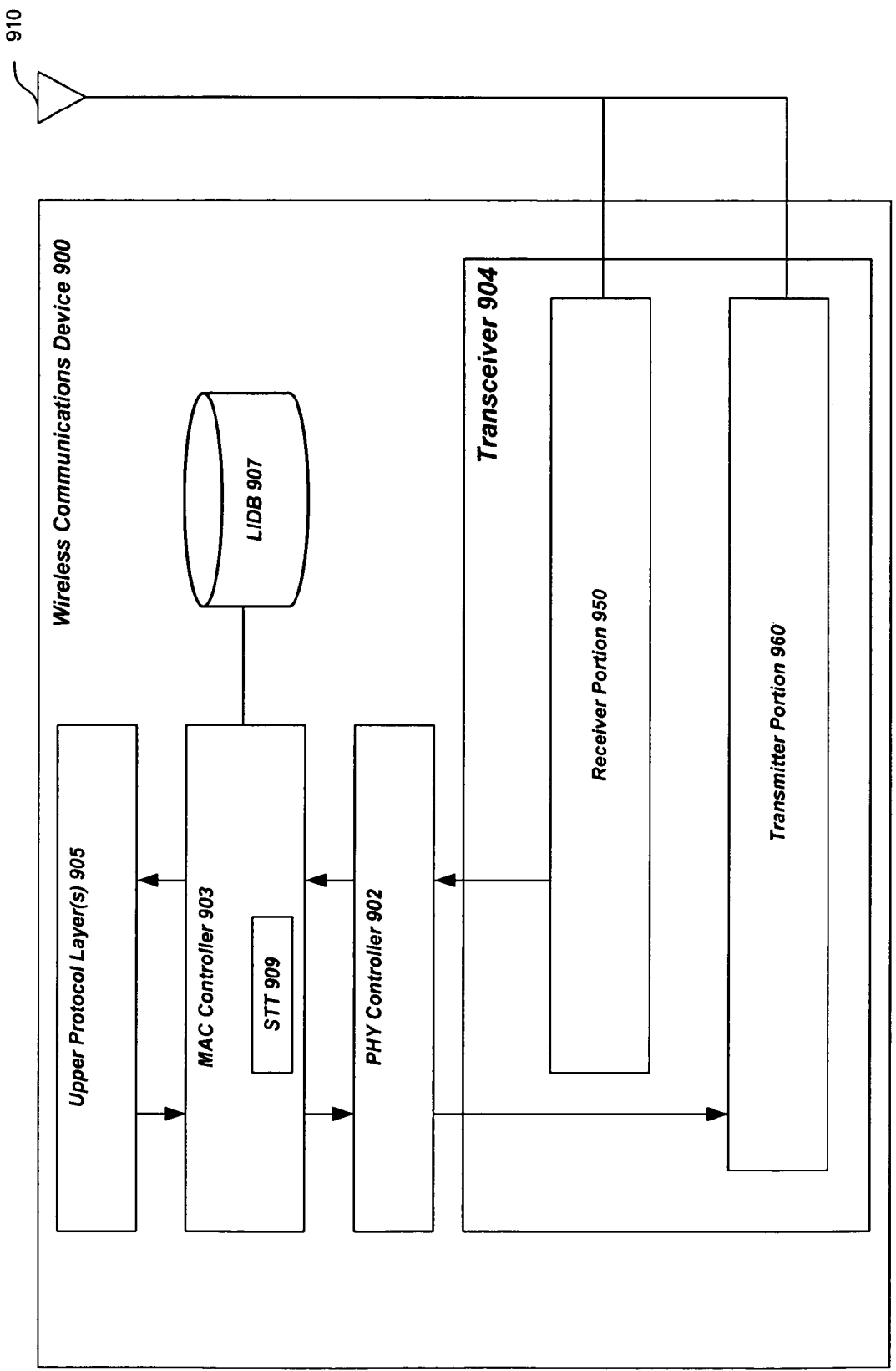
FIG. 9 is a diagram of an exemplary device architecture, according to an embodiment of the present invention.

FIG. 9 is a diagram of an exemplary wireless communications device 900, according to an embodiment of the present invention. This device may operate according to the techniques of the present invention. This device may be used in various communications environments, such as the environment of FIG. 1. As shown in FIG. 9, device 900 includes a physical layer (PHY) controller 902, a media access controller (MAC) 903, transceiver 904, upper protocol layer(s) 905, a locality information database (LIDB) 907, and an antenna 910.

MAC controller 903 generates frames (data transmissions) and beacons for wireless transmission. In addition, MAC controller 903 receives and processes frames and beacon transmissions that are originated from remote devices. MAC controller 903 exchanges these frames and beacon transmissions with PHY controller 902. In turn, PHY controller 902 exchanges frames and beacon transmissions with transceiver 904.

In addition PHY controller 902 may provide MAC controller 903 with signal strength indicators (e.g., RSSIs). In embodiments, MAC controller 903 request such indicators from PHY controller 902. Alternatively PHY controller 902 may provide such indicators to MAC controller 903 in an unsolicited manner. In embodiments employing MBOA communications, PHY controller 902 may measure RSSIs during the reception of the PLCP preamble.

Further, FIG. 9 shows that MAC controller 903 includes an STT module 909. This module that determines whether the device may employ a time-overlapping access technique or a non-concurrent access technique for data transmissions. This determination may be based on locality information stored in LIDB 907. Examples of such locality information include RSSI vectors, compiled RSSITs, and compiled MDTs. Accordingly, STT module 909 and LIDB 907 provide for MAC controller 903 to perform the steps of FIGS. 4-8.

FIG. 9 shows that transceiver 904 includes a receiver portion 950 and a transmitter portion 960. In embodiments of the present invention, transceiver 904 may transmit and receive OFDM signals. Accordingly, in such embodiments, transmitter portion 960 may include components, such as an inverse fast fourier transform (IFFT) module, a zero padding module, an upconverter, and a transmit amplifier. To receive OFDM signals, receiver portion 950 may include components, such as a downconverter, a receive amplifier, and a fast fourier transform (FFT) module.

As shown in FIG. 9, device 900 further includes one or more upper protocol layers 905. These layers may involve, for example, user applications. Accordingly, upper layers 905 may exchange information with remote devices. This involves layer(s) 905 exchanging protocol data units with MAC controller 903. In turn, MAC controller 903 operates with PHY controller 902 and transceiver 904 to transmit and receive corresponding wireless signals.

The device of FIG. 9 may be implemented in hardware, software, firmware, or any combination thereof. For instance, the components of portions 950 and 960 may include electronics, such as amplifiers, mixers, and filters. Moreover, implementations of device 900 may include digital signal processor(s) (DSPs) to implement various modules, such as components of receiver portion 950 and transmitter portion 960. Moreover, in embodiments of the present invention, processor(s), such as microprocessors, executing instructions (i.e., software) that are stored in memory (not shown) may be used to control the operation of various components in device 900. For instance, components, such as PHY controller 902 and MAC controller 903, may be primarily implemented through software operating on one or more processors.

Figure 10:
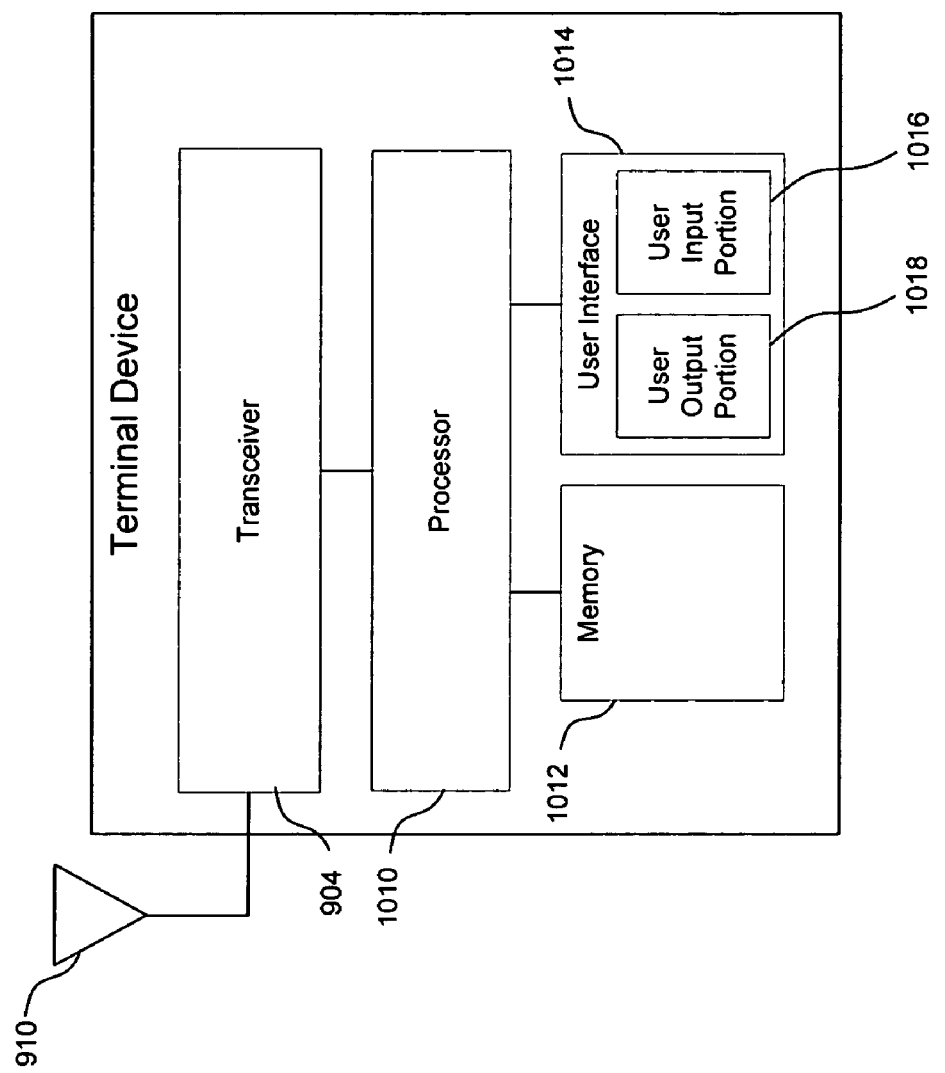
FIG. 10 is a diagram of an exemplary device implementation, according to an embodiment of the present invention.

One such implementation of the FIG. 9 architecture, according to an embodiment of the present invention, is shown in FIG. 10. This diagram illustrates the terminal device implemented according to one embodiment of the present invention. As shown in FIG. 10, this implementation includes a processor 1010, a memory 1012, and a user interface 1014. In addition, the implementation of FIG. 10 includes transceiver 904 and antenna 910. These components may be implemented as described above with reference to FIG. 9. However, the implementation of FIG. 10 may be modified to include different transceivers that support other wireless technologies.

Processor 1010 controls device operation. As shown in FIG. 10, processor 1010 is coupled to transceiver 904. Processor 1010 may be implemented with one or more microprocessors that are each capable of executing software instructions stored in memory 1012, for example, as a computer system.

Memory 1012 includes random access memory (RAM), read only memory (ROM), and/or flash memory, and stores information in the form of data and software components (also referred to herein as modules). These software components include instructions that can be executed by processor 1010. Various types of software components may be stored in memory 1012. For instance, memory 1012 may store software components that control the operation of transceiver 904. Also, memory 1012 may store software components that provide for the functionality of PHY controller 902, MAC controller 903, STT module 909, and upper protocol layer(s) 905. In addition, memory 1012 may store information for LIDB 907.

Moreover, memory 1012 may store software components that control the exchange of information through user interface 1014. As shown in FIG. 10, user interface 1014 is also coupled to processor 1010. User interface 1014 facilitates the exchange of information with a user. FIG. 10 shows that user interface 1014 includes a user input portion 1016 and a user output portion 1018.

User input portion 1016 may include one or more devices that allow a user to input information. Examples of such devices include keypads, touch screens, and microphones. User output portion 1018 allows a user to receive information from the device. Thus, user output portion 1018 may include various devices, such as a display, and one or more audio speakers (e.g., stereo speakers) and a audio processor and/or amplifier to drive the speakers. Exemplary displays include color liquid crystal displays (LCDs), and color video displays.

The elements shown in FIG. 10 may be coupled according to various techniques. One such technique involves coupling transceiver 904, processor 1010, memory 1012, and user interface 1014 through one or more bus interfaces. In addition, each of these components is coupled to a power source, such as a removable and/or rechargeable battery pack (not shown).

XI. Conclusion

While various embodiments of the present invention have been described above, it should be understood that they have been presented by way of example only, and not in limitation. For instance, although examples have been described involving MBOA communications, other short-range and longer-range communications technologies are within the scope of the present invention. Moreover, the techniques of the present invention may be used with signal transmission techniques other than OFDM.

Accordingly, the present invention is not limited to MBOA networks. In fact, the techniques of the present invention can employed in any media access control protocol. For instance, the techniques of the present invention may be employed with random access and contentionless access methods, as well as in centralized and distributed systems. Moreover, these techniques may be employed in networks having different superframe structures. In networks having a centralized controller device (such as an IEEE 802.15.3 coordinator device), the techniques of the present invention may be performed by the central controller.

Moreover, the present invention is not limited to traffic patterns involves point to point transmissions. Other traffic patterns may occur in which a single device sends "multicast" transmissions to multiple devices. Such multicast transmissions may be directed to devices that are relatively "close" to the transmitting device in comparison with the other network devices.

Therefore, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, comprising:
   (a) participating with a first wireless device in a wireless communications network of a plurality of wireless devices including the first wireless device and a plurality of other wireless devices, having a shared transmission medium for the exchange of communications traffic between the wireless devices in the network, by each device in the network transmitting and receiving beacon transmissions that maintain coordination between the plurality of wireless devices in the wireless communication network and provide information regarding resource allocations for the shared transmission medium;
   (b) determining at the first wireless device a value for at least one interference condition in the shared transmission medium of the wireless communications network between said first wireless device and one of said other wireless devices in the network, wherein the value of the interference condition is determined at least partly based on the received beacon transmissions at the first wireless device; and
   (c) scheduling with the first wireless device a planned transmission to said one of said other wireless devices in the network, wherein said scheduling step employs a time-overlapping access technique for the planned transmission when the value for the at least one interference condition is less than a predetermined threshold and employs a non-concurrent access technique for the planned transmission when the value for the at least one interference condition is greater than or equal to the predetermined threshold.

2. The method of claim 1, wherein the at least one interference condition is from the perspective of the one of said other wireless communications devices.

3. The method of claim 1, wherein said determining step is based on locality information of one or more devices in the wireless communications network.

4. The method of claim 1, wherein said determining step is further based on planned transmissions of the one or more devices in the wireless communications network.

5. The method of claim 1, further comprising:
   detecting the at least one interference condition.

6. The method of claim 1, further comprising:
   when the scheduling step employs the time-overlapping access technique, transmitting the planned transmission to the one of said other wireless devices at a time alignment that overlaps with one or more other transmissions in the wireless communications network.

7. The method of claim 6, wherein the transmitting step includes transmitting the planned transmission to the one of said other wireless devices at a reduced power level when the scheduling step employs the time-overlapping access technique.

8. The method of claim 1, further comprising:
gathering a plurality of signal strength indicators, each signal strength indicator associated with a transmission from a corresponding device in the wireless communications network;
wherein said determining step determines the value for the at least one interference condition based on the plurality of signal strength indicators.

9. The method of claim 8, wherein the plurality of signal strength indicators includes a first indicator corresponding to a transmission from the one of said other wireless communications devices, and a second signal strength indicator, the second signal strength indicator having the largest magnitude of the plurality of signal strength indicators; and
wherein step (b) comprises comparing the first and second signal strength indicators.

10. The method of claim 8, wherein step (b) comprises from the plurality of signal strength indicators, calculating a total interference level for the one of said other wireless communications devices.

11. The method of claim 8, wherein each received transmission is a beacon transmission.

12. The method of claim 1, wherein the shared transmission medium includes a repeating time interval within a predetermined frequency range.

13. The method of claim 1, further comprising:
gathering a plurality of distance indicators, each distance indicator representing a physical distance between a respective device pairing in the wireless communications network;
wherein said determining step determines the value for the at least one interference condition based on the plurality of distance indicators.

14. The method of claim 1, further comprising determining a level of network availability;
wherein steps (c) and (d) are bypassed when the level of network availability is greater than a predetermined amount.

15. An apparatus, comprising:
a transceiver configured to exchange signals across a wireless communications network, the wireless communications network of a plurality of wireless devices including the apparatus and a plurality of other wireless devices, having a shared transmission medium for the exchange of communications traffic between the wireless devices in the network, by each device in the network transmitting and receiving beacon transmissions that maintain coordination between the plurality of wireless devices in the wireless communication network and provide information regarding resource allocations for the shared transmission medium;
a controller configured to:
(a) determine a value for at least one interference condition in the shared transmission medium of the wireless communications network between said apparatus and one of said other wireless devices in the network, wherein the value of the interference condition is determined at least partly based on the received beacon transmissions at the apparatus, and
(b) schedule a planned transmission to said one of said other wireless devices in the network, wherein said scheduling employs a time-overlapping access technique for the planned transmission when the value for the at least one interference condition is less than a predetermined threshold and employs a non-concurrent access technique for the planned transmission when the value for the at least one interference condition is greater than or equal to the predetermined threshold.

16. The apparatus of claim 15, further comprising a storage medium configured to store locality information regarding a plurality of devices, wherein the controller is configured to determine the value for the at least one interference condition based on the locality information.

17. The apparatus of claim 16, wherein the locality information includes a plurality of signal strength indicators, each signal strength indicator associated with a transmission from a corresponding device in the wireless communications network.

18. The apparatus of claim 17, wherein the plurality of signal strength indicators includes a first indicator corresponding to a transmission from the one of said other wireless communications devices, and a second signal strength indicator, the second signal strength indicator having the largest magnitude of the plurality of signal strength indicators; and
wherein the controller is configured to assess the at least one interference condition by comparing the first and second signal strength indicators.

19. The apparatus of claim 17, wherein the controller is configured to determine the value for the at least one interference condition by calculating a total interference level from the plurality of signal strength indicators.

20. The apparatus of claim 16, wherein the locality information includes a plurality of distance indicators, each distance indicator representing a physical distance between a respective device pairing in the wireless communications network.

21. The apparatus of claim 15, wherein the shared transmission medium includes a repeating time interval within a predetermined frequency range.

22. An apparatus, comprising:
means for participating with a first wireless device in a wireless communications network of a plurality of wireless devices including the first wireless device and a plurality of other wireless devices, having a shared transmission medium for the exchange of communications traffic between the wireless devices in the network, by each device in the network transmitting and receiving beacon transmissions that maintain coordination between the plurality of wireless devices in the wireless communication network and provide information regarding resource allocations for the shared transmission medium;
means for determining at the first wireless device a value for at least one interference condition in the shared transmission medium of the wireless communications network between said first wireless device and one of said other wireless devices in the network, wherein the value of the interference condition is determined at least partly based on the received beacon transmissions at the first wireless device; and
means for scheduling with the first wireless device a planned transmission to said one of said other wireless device in the network, wherein said scheduling step employs a time-overlapping access technique for the planned transmission when the value for the at least one interference condition is less than a predetermined threshold and employs a non-concurrent access technique for the planned transmission when the value for the at least one interference condition is greater than or equal to the predetermined threshold.

23. A computer readable storage medium, comprising:

said computer readable storage medium containing computer executable instructions for enabling a processor in a first wireless device;

program code in the computer readable storage medium, for enabling the processor to cause the first wireless device to participate in a wireless communications network of a plurality of wireless devices including the first wireless device and a plurality of other wireless devices, having a shared transmission medium for the exchange of communications traffic between the wireless devices in the network, by each device in the network transmitting and receiving beacon transmissions that maintain coordination between the plurality of wireless devices in the wireless communication network and provide information regarding resource allocations for the shared transmission medium;

program code in the computer readable storage medium, for enabling the processor to determine a value for at least one interference condition in the shared transmission medium of the wireless communications network between said first wireless device and one of said other wireless devices in the network, wherein the value of the interference condition is determined at least partly based on the received beacon transmissions at the first wireless device; and program code in the computer readable storage medium, for enabling the processor to schedule a planned transmission to said one of said other wireless devices in the network, wherein said scheduling step employs a time-overlapping access technique for the planned transmission when the value for the at least one interference condition is less than a predetermined threshold and employs a non-concurrent access technique for the planned transmission when the value for the at least one interference condition is greater than or equal to the predetermined threshold.

24. A method, comprising:

(a) receiving at a first wireless device in a group a plurality of beacon messages from a plurality of other wireless devices in the group across a wireless transmission medium, wherein the beacon messages are for maintaining coordination between wireless devices in the group, the beacon messages including a first value for a first interference condition between at least two of said plurality of other wireless devices in the group, wherein the value of the first interference condition is determined at least partly based on received beacon transmissions at one of said two of said plurality of other wireless devices;

(b) determining at the first wireless device a second value for a second interference condition between said first wireless device and said one of said two of said plurality of other wireless devices in the group, wherein the second value of the second interference condition is determined at least partly based on the received beacon transmissions at the first wireless device; and (c) sending by the first wireless device in a beacon message to said plurality of other wireless devices in the group, an announcement scheduling a planned transmission between said first wireless device and said one of said two of said plurality of other wireless devices in the group, wherein said scheduling employs a time-overlapping access technique for the planned transmission when a comparison of said first value and second value is less than a predetermined threshold.

25. A method, comprising:

(a) participating with a first wireless device in a wireless communications network of the first wireless device and a plurality of other wireless devices, having a shared transmission medium for the exchange of communications traffic between the wireless devices in the network, by each device in the network transmitting and receiving beacon transmissions that maintain coordination between the plurality of wireless devices in the wireless communication network and provide information regarding resource allocations for the shared transmission medium, the beacon transmissions including a first value for a first interference condition between two of said plurality of other wireless devices in the network, wherein the value of the first interference condition is determined at least partly based on received beacon transmissions at one of said two other wireless devices;

(b) determining at the first wireless device a second value for a second interference condition in the shared transmission medium of the wireless communications network between said first wireless device and said one of said two other wireless devices in the network, wherein the value of the second interference condition is determined at least partly based on the received beacon transmissions at the first wireless device; and (c) sending by the first wireless device in a beacon transmission to said plurality of other wireless devices in the network, an announcement scheduling a planned transmission to said one of said two other wireless devices in the network, wherein said scheduling employs a time-overlapping access technique for the planned transmission when a comparison of said first value and second value is is less than a predetermined threshold.

26. A method, comprising:

(a) participating with a first wireless device in a wireless communications network of the first wireless device and a plurality of other wireless devices, having a shared transmission medium for the exchange of communications traffic between the wireless devices in the network, by each device in the network transmitting and receiving beacon transmissions that maintain coordination between the plurality of wireless devices in the wireless communication network and provide information regarding resource allocations for the shared transmission medium;

(b) determining at the first wireless device a value for a first interference condition in the shared transmission medium of the wireless communications network between said first wireless device and a first one of said other wireless devices in the network and receiving a first schedule of planned transmissions by the first one of said other wireless devices, wherein the value of the first interference condition and the first schedule are at least partly based on the received beacon transmissions at the first wireless device;

(c) determining at the first wireless device a value for a second interference condition in the shared transmission medium of the wireless communications network between said first wireless device and a second one of said other wireless devices in the network and receiving a second schedule of planned transmissions by the second one of said other wireless devices, wherein the value of the second interference condition and the second schedule are at least partly based on the received beacon transmissions at the first wireless device; and (d) scheduling with the first wireless device a planned transmission to said first one of said other wireless devices in the network, wherein said scheduling step employs a time-overlapping access technique for the planned transmission when the second value for the second interference condition is less than a predetermined threshold, even though the second schedule of planned transmissions by the second one of said other wireless devices overlaps said planned transmission scheduling of the first wireless device with the first one of said other wireless devices.

* * * * *